US010628798B2

United States Patent
Gavrielides et al.

(10) Patent No.: US 10,628,798 B2
(45) Date of Patent: Apr. 21, 2020

(54) SYSTEM AND METHOD FOR PRIVATE CONTACT SHARING

(71) Applicant: Covve Visual Network Ltd., Nicosia (CY)

(72) Inventors: Yiannis Gavrielides, Nicosia (CY); Alexandros Protogerellis, Nicosia (CY)

(73) Assignee: Covve Visual Network Ltd., Nicosia (CY)

( * ) Notice: Subject to any disclaimer, the term of this patent is extended or adjusted under 35 U.S.C. 154(b) by 174 days.

(21) Appl. No.: 15/437,246

(22) Filed: Feb. 20, 2017

(65) Prior Publication Data

US 2017/0243162 A1    Aug. 24, 2017

Related U.S. Application Data

(60) Provisional application No. 62/297,972, filed on Feb. 22, 2016.

(51) Int. Cl.
*G06Q 10/10* (2012.01)
*G06F 16/27* (2019.01)
(Continued)

(52) U.S. Cl.
CPC ......... *G06Q 10/109* (2013.01); *G06F 16/273* (2019.01); *G06F 16/24575* (2019.01);
(Continued)

(58) Field of Classification Search
CPC ...... G06Q 10/109; G06Q 10/00; G06Q 10/10; G06F 17/30578; G06F 17/30598; G06F 17/30424; G06F 17/30345; G06F 16/273; G06F 16/288; G06F 16/337; G06F 16/335; G06F 16/24575; G06F 16/242;
(Continued)

(56) References Cited

U.S. PATENT DOCUMENTS 7,322,047 B2    1/2008  Redlich
8,107,930 B1 *  1/2012  Oh ................... H04M 1/274516
                                                    455/414.1

(Continued)

OTHER PUBLICATIONS

Amit Agarwal, "Use Google Contacts as a Unified Address Book", Oct. 29, 2010, Retrieved from the Internet: <https://lifehacker.com/use-google-contacts-as-a-unified-address-book-5676676> [retrieved on Jun. 21, 2019].

(Continued)

*Primary Examiner* — Kristine L Kincaid
*Assistant Examiner* — Alexander R Lapian
(74) *Attorney, Agent, or Firm* — Han Santos, PLLC

(57) ABSTRACT

Disclosed is a system having a plurality of user devices, a plurality of databases, and servers in communication over a network. Each of the devices synchronizes one or more address books comprising contact information. The contact information is enhanced and then cleansed. The enhanced contact information is then hashed so that the personally identifiable information is made unavailable. The system then identifies common contacts representing the same real person and creates a single composite view of the person. Thereafter, the system shares the single composite view between users while obfuscating information that personally identifies such contacts.

20 Claims, 3 Drawing Sheets

(51) Int. Cl.
*G06F 16/28* (2019.01)
*G06F 16/335* (2019.01)
*G06F 16/2457* (2019.01)
*G06F 21/62* (2013.01)

(52) U.S. Cl.
CPC .......... *G06F 16/288* (2019.01); *G06F 16/335* (2019.01); *G06F 16/337* (2019.01); *G06F 21/6254* (2013.01)

(58) Field of Classification Search
CPC ............... G06F 16/9535; G06F 16/951; G06F 21/6254; G06F 21/6227; H04L 67/10; H04L 67/22; H04L 67/306; H04L 29/08
See application file for complete search history.

(56) References Cited

U.S. PATENT DOCUMENTS

| | | | |
|---|---|---|---|
| 8,560,456 B2 | 10/2013 | Williams | |
| 8,611,509 B1* | 12/2013 | Basart | G06Q 10/109 |
| 8,751,808 B2* | 6/2014 | Gelbard | H04L 51/12 |
| | | | 713/170 |
| 9,251,193 B2 | 2/2016 | Ariel | |
| 9,275,419 B1* | 3/2016 | Aguiar Marcano | |
| | | | G06F 16/9535 |
| 2005/0182745 A1 | 8/2005 | Dhillon | |
| 2006/0236089 A1* | 10/2006 | Cohen | G06Q 10/10 |
| 2007/0081649 A1* | 4/2007 | Baudino | H04M 3/42042 |
| | | | 379/201.11 |
| 2008/0125148 A1 | 5/2008 | Zhao | |
| 2008/0243789 A1* | 10/2008 | Kussmaul | G06Q 10/00 |
| 2008/0261569 A1* | 10/2008 | Britt | G06Q 10/107 |
| | | | 455/414.1 |
| 2009/0079811 A1* | 3/2009 | Brandt | H04N 7/15 |
| | | | 348/14.1 |
| 2010/0199098 A1 | 8/2010 | King | |
| 2010/0306185 A1 | 12/2010 | Smith et al. | |
| 2011/0196953 A1* | 8/2011 | Samaha | G06Q 10/10 |
| | | | 709/223 |
| 2012/0150888 A1* | 6/2012 | Hyatt | G06F 16/288 |
| | | | 707/758 |
| 2012/0158744 A1 | 6/2012 | Tseng et al. | |
| 2015/0033292 A1* | 1/2015 | Nguyen | H04L 63/08 |
| | | | 726/4 |
| 2015/0134603 A1* | 5/2015 | Melamed | G06F 11/1453 |
| | | | 707/609 |
| 2015/0288744 A1 | 10/2015 | Dwan et al. | |

OTHER PUBLICATIONS

International Application No. PCT/IB2018/050689, International Search Report and Written Opinion dated Apr. 6, 2018, 12 pages.

* cited by examiner

SYSTEM AND METHOD FOR PRIVATE CONTACT SHARING

CROSS-REFERENCE TO RELATED APPLICATIONS

This application claims the benefit of U.S. Provisional Patent Application No. 62/297,972 filed Feb. 22, 2016, which is hereby incorporated by reference in its entirety.

FIELD OF THE INVENTION

The present invention relates generally to a system and method for networking. More particularly, the present invention is directed to a system and method for sharing enhanced contact information while protecting data and privacy.

BACKGROUND OF THE INVENTION

Social networks are great tools for introducing and managing connections and referrals among professionals. Existing contact networks generally allow users to share contacts and/or openly view other users' profiles and related contact information. In this regard, the information that is shared is openly available such that the users are identified by their name, position, and other personally identifiable information.

Although some systems allow users to set privacy settings, limiting profile views, to many professionals, can still present privacy and confidentiality concerns. Additionally, current privacy and security regulations may present legal constraints (e.g., EU data protection regulation). Thus, an improved system and method for making connections is needed. In this regard, the invention described herein addresses this problem.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

Various embodiments of the preset disclosure can include systems, methods, and non-transitory computer-readable media configured to enhance and hash personally identifiable information (PII) in contact information. In some embodiments, the present invention may be applied to contact sharing and/or online privacy that comply with data protection regulation.

In some embodiments, the non-transitory computer readable media comprises a set of instructions stored thereon. The computer readable media is operatively connected to a processor unit for executing the instructions to result in a downloadable or non-downloadable software application. The application is configured to synchronize one or more address books locally stored or remotely accessible to a user device. Contact information contained within the address books is enhanced via data mining and/or web mining tools to fill in any information gaps and make each contact's information more complete.

In some embodiments, contacts are consolidated or cleansed to remove duplicate contacts and organize contact information. The enhanced contact information is scrambled or hashed so that the personally identifiable information relating to each contact is made unavailable. The system then identifies common contacts representing the same real person and creates a single composite view of the person. Thereafter, the system shares this view between users while obfuscating information that personally identifies such contacts.

Many other features and embodiments of the invention will be apparent from the accompanying drawings and from the following detailed description.

DETAILED DESCRIPTION OF THE INVENTION

Figure 1:
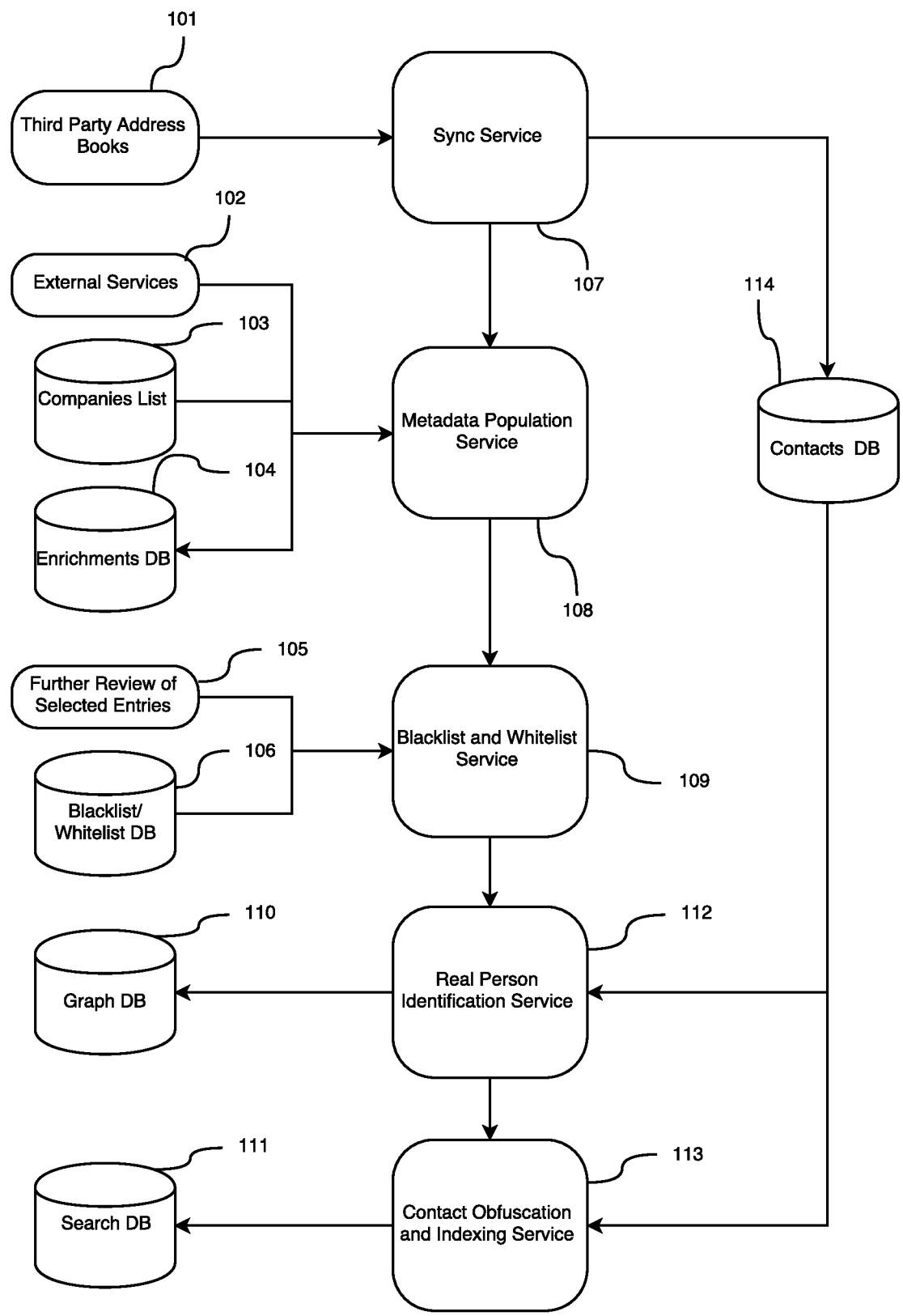
FIG. 1 depicts an exemplary system diagram of the present invention.

The present invention is directed towards a system and method for enhancing contact data, scrubbing contact data, and creating a real person profile for improving contact sharing while increasing privacy. For purposes of clarity, and not by way of limitation, illustrative views of the present system and method are described with references made to the above-identified figures. Various modifications obvious to one skilled in the art are deemed to be within the spirit and scope of the present invention.

Certain embodiments are described herein as including logic or a number of components, modules, system, interface, or mechanisms, which are generally intended to refer to a computer-related entity, either software modules (e.g., code embodied on a machine-readable medium or in a transmission signal), hardware modules, or a combination thereof. A hardware module is a tangible unit (e.g., a computer system, a processor) capable of performing certain operations and may be permanently or temporarily configured or arranged in a certain physical manner. In various example embodiments, one or more computer systems or one or more hardware modules of a computer system may be configured by software as a hardware module that operates to perform certain operations as described herein. Additionally, one or more components, modules, system, interface, or mechanisms can reside within a process and/or thread of execution and a component, module, system, interface, or mechanism can be localized on one computer and/or distributed between two or more computers.

Similarly, the methods described herein may be at least partially processor-implemented. For example, at least some of the operations of a method may be performed by one or more processors or processor-implemented modules, wherein performance of certain of the operations may be distributed among the one or more processors. Moreover, the one or more processors may also operate to support performance of the relevant operations in a "cloud computing" environment, "software as a service" (SaaS), or "infrastructure as a service" (IaaS). For example, at least some of the operations may be performed by a group of computers (as examples of machines including processors), with these operations being accessible via a network (e.g., the Internet) and via one or more appropriate interfaces (e.g., I/O components, associated processor, application, and/or an application program interface (API)).

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Discussions herein utilizing terms such as, for example, "processing," "computing," "calculating," "determining," "establishing," "identifying," "analyzing," "checking," or the like, may refer to operations(s) and/or process(es) of a computer, a computing platform, a computing system, or other electronic computing device, that manipulate and/or transfer data represented as physical (e.g., electronic) quantities within the computer's registers and/or memories into other data similarly represented as physical quantities within the computer's registers and/or memories or other information storage medium that may store instructions to perform operations and/or processes.

As used herein, the word "exemplary" means serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or."

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. In this regard, the articles "a" and "an" as used in this application and the appended claims should generally be construed to mean "one or more" or "at least one" unless specified otherwise or clear from context to be directed to a singular form.

Referring now to FIG. 1, there is shown a system diagram of the present invention in operation, respectively. The present system comprises a plurality of user devices and one or more servers (e.g., application server, mail server, third party server) in connection with a network (e.g., the Internet, LAN, etc.), wherein the user devices comprise various types of computer systems, including smart phones, personal digital assistants, computer tablets, and the like. In this regard, some embodiments of the system and method of the present invention are taught and disclosed in terms of mobile computing. It should be understood, however, that the same principles are applicable to nearly any device capable of executing a machine-readable instruction.

The user device comprises a memory unit having instructions stored thereon, wherein the memory unit is operatively connected to a processing unit for executing the instructions to result in a software application, wherein the application comprises a mobile application, a web application, a website, a plug-in, or other non-downloadable or downloadable applications.

In some embodiments, the memory unit of the user device comprises at least one address book 101 stored locally thereon. The address book 101 comprises an address book that is native to the user device and that the user devices uses by default, for example, to make phone calls or send text messages. In some embodiments, the user device is configured to access at least one address book 101 from a third party application that is installed on the user device or from a server such as an email server or other types of servers in communication with the user device (e.g., GMAIL™, MICROSOFT OUTLOOK™, YAHOO™, etc.), whereby each of the address books comprises a contacts list. In some embodiments, the application comprises an address book comprising a contacts list. In this regard, contact information is directly entered and stored via the application. Without limitation, the address books comprise contact information such as names, phone numbers, fax numbers, addresses (including mailing addresses, home addresses, businesses, and email addresses), job titles, affiliated organizations, notes, or any combination thereof, for each of the contacts in the contacts list of the address books. It is noted that contact information can comprise any information that is related to the contact that can help identify that contact.

In some embodiments, the application is configured to determine or verify the owner (i.e., the user of the user device) of the address books 101 so that the contact information within the address books can be made fully visible only to the owner, but not visible or limited in visibility to non-owners. In this regard, it is contemplated that the application is configured to prompt the owner to go through an authentication process. For example, the application can prompt the owner to log-in to his or her email account or into a third party application in which the address books are stored. The application comprises a synchronization service 107 that is configured to synchronize the address books 101 to a contacts database 114 preferably in a bi-directional manner. In some embodiments where the application comprises an address book, synchronization is not necessary.

Contact information related to each of the contacts within the address books is enhanced via a metadata population service 108. Without limitation, the metadata population service 108 is configured to determine a contact's country of residence using, for example, the contact's phone number, with or without a country code, derive a contact's seniority based on their job title, and derive a contact's industry based on their job title, depending upon embodiments. In some embodiments, it is contemplated that the metadata population service 108 comprises data mining tools, web mining tools, web crawlers, and/or similar types of data aggregation means for obtaining information from external services 102 or databases, including companies list 103 and other third-party databases, including social network systems.

The companies list 103 comprises a publicly or privately accessible database that stores information or metadata relating to individuals associated with certain companies, organizations, institutions, associations, and the like. For example, the companies list 103 comprises metadata or information relating to company domains (e.g., email domain) and company names. The company domain can be used to derive the company name and industry. Any mined metadata or information obtained using the data mining tools and/or the web crawling tools of the metadata population service 108 and other data relating to the metadata population service 108 are stored in an enrichments database 104.

Contact information is cleansed via a blacklist and whitelist service 109. In this regard, each contact information is processed to determine whether even its obfuscated, unidentified version should be shareable. This is determined by passing the contact information through a blacklist and then a whitelist. When passing the contact information through the blacklist, the blacklist and whitelist service 109 determines whether any blacklisted terms are associated with a contact. If any blacklisted terms are associated with the contact, then the contact information related to that contact is labeled as not shareable. Non-limiting examples of blacklisted terms comprise terms relating to fraud, bribery, theft, disciplinary actions, punishment, fine, and other disqualifying terms.

Conversely, when passing the contact information through the whitelist, the blacklist and whitelist service 109 determines whether any whitelisted terms are associated with the contact. If only whitelisted terms appear—that is no blacklisted terms are associated, then the contact is labeled as shareable. It is contemplated that blacklisted terms and whitelisted terms are predefined by the blacklist and whitelist service 109 and stored in the blacklist/whitelist database 106. In some embodiments, additional blacklisted terms and whitelisted terms can be added to the blacklist/whitelist database 106. Additionally, the blacklist and whitelist service 109 comprises other parameters or criteria for blacklisting or whitelisting contact information. In this regard, these parameters, criteria, and other data pertaining to blacklist/whitelist service 109 are stored in the blacklist/whitelist database 106.

Contacts that are not automatically marked as shareable or not shareable are put in a "pending" state and are reviewed further 105. For example, if contact information does not comprise any whitelisted terms or any blacklisted terms, the contact information is flagged so that it can be reviewed further. Additionally, if the contact information comprises terms that are sufficiently close or related to any blacklisted or whitelisted terms (e.g., terms that contain synonyms to blacklisted or whitelisted terms), the contact information is flagged and processed for further review. It is contemplated that the blacklist and whitelist service 109 comprises machine-learning algorithm to determine whether certain contacts need to be reviewed further (e.g., based on patterns, confidence scores, etc.). In some embodiments, the contact information manually processed for further review, for example, via service providers. In some embodiments, the contact information is processed through additional parameters or criteria.

The contacts are made unidentifiable or anonymous by removing PII, including contact names, scrambling or hashing contact details (e.g., address, phone number, email, social profiles), genericizing job titles, associating each of the contacts with a unique identification number or code, or any combination thereof. After the contacts are made unidentifiable (i.e., PII is removed), the system consolidates and curates all view of the real person via a real person identification service 112 that communicates with a database (e.g., a graph database 110).

The real person identification service 112 identifies contacts representing the same real person from various address books. Once the contact is identified, the application creates a more complete and accurate view of the real person by filling in metadata from various recommended sources and/or other address books comprising information relating to that contact. Any incorrect metadata is not applied to the composite view. In some embodiments, the application is configured to supplement any missing contact information using mined metadata or other metadata stored in the enrichments database 104. In a preferred embodiment, missing contact information comprises public or non-private metadata that can be obtained from the enrichments database 104.

Upon receiving a request for contact information for an individual having specific criteria (e.g., for a job position), the application locates contact information for individuals that meet the specified criteria with the requesting user via a contact obfuscation and indexing service 113 that communicates with a search database 111. If target contact information is found in a user's address book, the application, upon obtaining permission from the user (i.e., the contact owner), shares the target contact information with the requesting user. In this way, requesting users seeking contacts with specific criteria are matched with the target contact information (i.e., the most complete metadata view of a contact) that fits the requesting users' criteria.

In some embodiments, the application is configured to identify the owner of the address book (i.e., a referrer) having the contact information for individuals (i.e., a target) that meet the specified criteria. In this regard, the application does not share the actual the contact information for the individuals, or the targets, that meet the specified criteria. Instead, the application shares the referrer's information with the requesting user.

Figure 2:
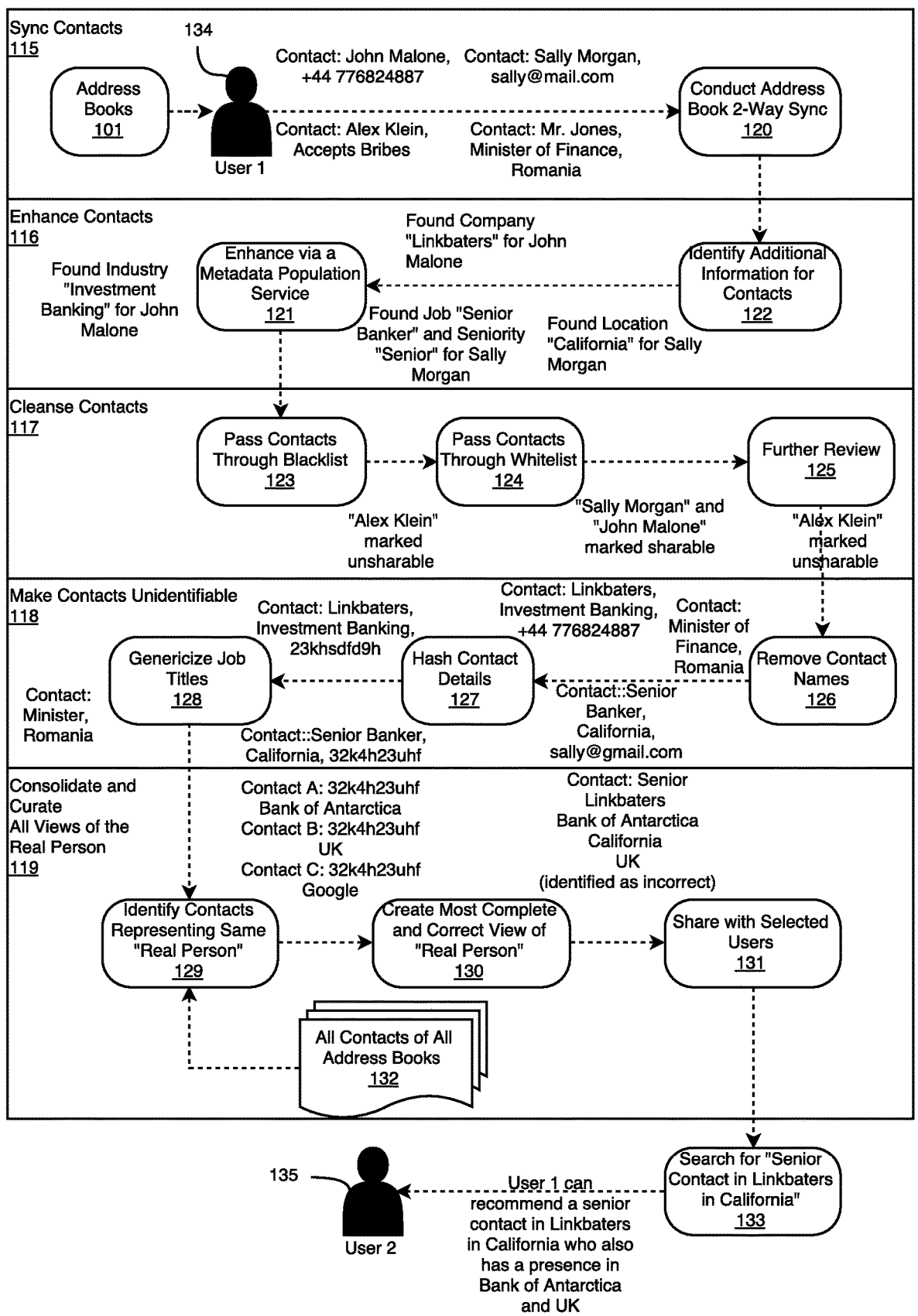
FIG. 2 shows an exemplary embodiment of the present private contact-sharing flowchart.

References are also made to FIG. 2, which schematically illustrate exemplary methods of the present invention. In some embodiments, one or more operations of FIG. 2 may be performed by one or more elements of the system as described in FIG. 1.

A first user 134, via the application of the present system, synchronizes the first user's contact information 115 by conducting a two-way synchronization 120 of the first user's address books 101 via the synchronization service 107 (FIG. 1). In this regard, all data relating to contacts (i.e., contact information) stored within the address books 101 are synchronized. In some embodiments, the application itself comprises the first user's address books 101, thereby eliminating the need for synchronization. In the illustrated embodiment, the first user's 134 address books 101 comprise contact information for John Malone, Sally Morgan, Alex Klein, and Mr. Jones. Thus, contact information relating to John Malone, Sally Morgan, Alex Klein, and Mr. Jones are synchronized.

Upon synchronization, the contact information is enhanced 116 by identifying additional information for the contacts 122 (e.g., scanning the web for public information) via a metadata population service 121, wherein the metadata population service 108 (FIG. 1) comprises web mining tools and other third party services. In the illustrated embodiment, the web mining tools are configured to locate information for contacts in the address books 101 (i.e., John Malone, Sally Morgan, Alex Klein, and Mr. Jones).

Upon enhancing contacts, the contact information is cleansed 117 by passing the contact information through a blacklist 123 and then passing the contact information through a whitelist 124 via the blacklist and whitelist service 109 (FIG. 1). In the illustrated embodiment, contact information for Alex Klein is passed through the blacklist and is marked or labeled unsharable because Alex Klein accepts bribes. In this regard, the term "bribe(s)" is a blacklisted term. The contact information for Sally Morgan and John Malone clears the blacklist and are passed through the white list. Upon clearing the whitelist, the contact information for Sally Morgan and John Malone are marked or labeled sharable. In the illustrated embodiment, the contact information for Alex Klein is flagged or processed for further review 125. Upon further review, the contract information for Alex Klein remains marked or labeled unsharable.

Sharable contacts are made unidentifiable 118 by removing contact names 126, hashing contact details 127, and genericizing job titles 128. In the illustrated embodiment, the contact information for Sally Morgan is made unidentifiable by removing the contact's name and replacing the email address with a unique identifier. Additionally, the job title for Mr. Jones is genericized to minister from a minister of finance.

Upon making contacts unidentifiable, all views of the real person 119 are consolidated and curated by identifying contacts representing the same real person 129 via the real person identification service 112 (FIG. 1). In this regard, contact information from various address books is used to identify the contacts 132. As discussed above, contact information comprises various types of information correlating to the contact. In the illustrated embodiment, Contact A, Contact B, and Contact C correlate to contact information for Sally Morgan. Once the contact is identified, a more completed and correct view of the contact is created 130 by filling in metadata from various recommended sources and/or other address books comprising information relating to that contact.

In operation, the application receives a request from a second user 135, for example, via a user interface, for contact information for an individual having specific criteria or qualifications. In the illustrated embodiment, the criteria include "a senior contact in Linkbaters in California" 133.

Upon receiving the second user's 135 request, the application locates contact information for an individual meeting the criteria (e.g., an individual having a senior position, an individual located in California, an individual having a presence in a company called "Linkbaters" and the United Kingdom). If the application locates target contact information that meets the criteria in the first user's address book 101, the application can prompt the first user to share the contact information. Upon receiving the first user's input or permission, the individual's contact information with shared with the second user 135 or selected users (i.e., the requesting user) 131 via a contact obfuscation and indexing service 113 (FIG. 1). In this way, the second user 135 seeking contacts with specific criteria is matched with the contact information (i.e., the most complete metadata view of a contact) that fits the second user's 135 criteria.

Figure 3:
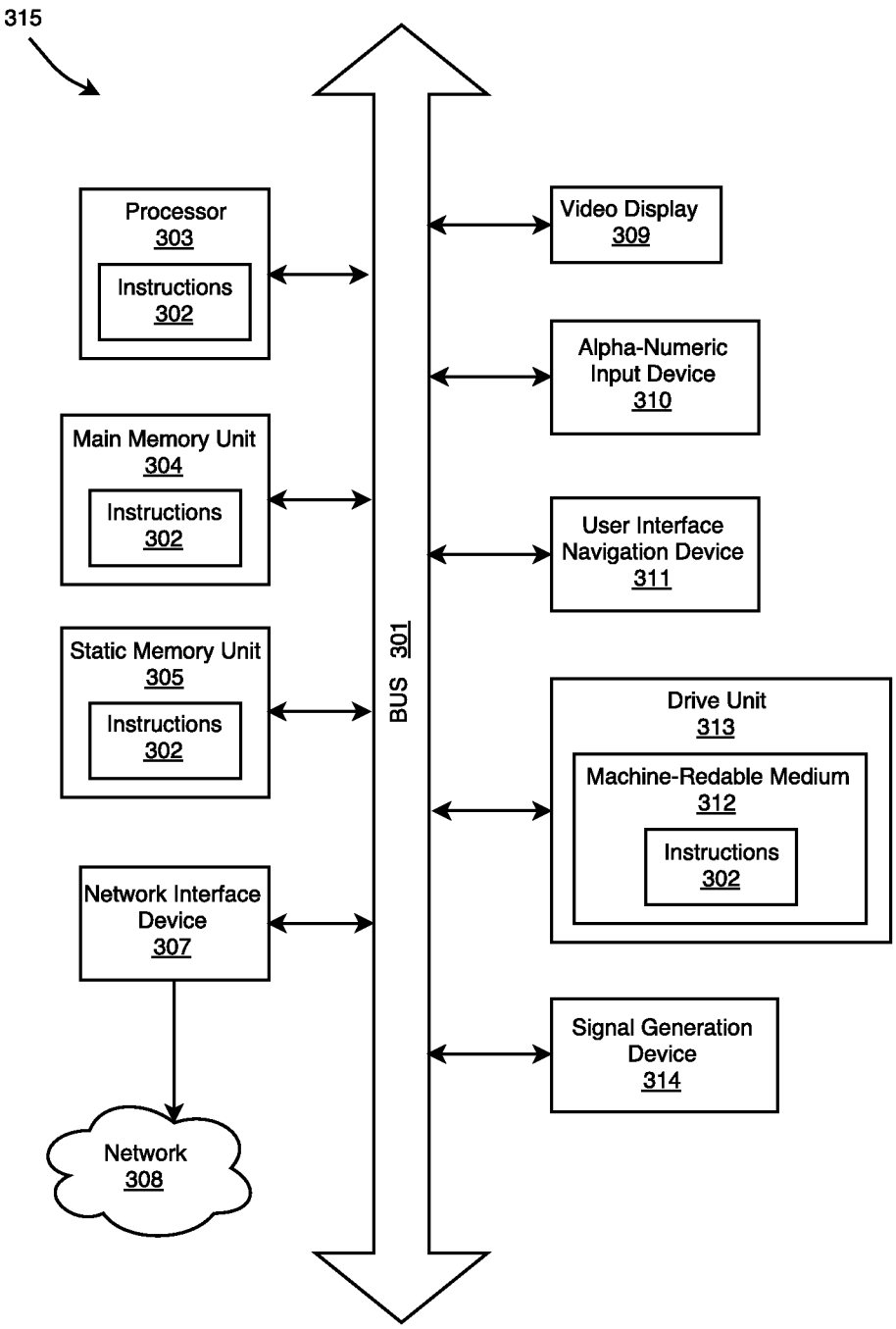
FIG. 3 shows a block diagram illustrating components of a machine able to read instructions from a machine-readable medium.

FIG. 3 is a block diagram illustrating components of a user device 315 or a machine, according to some example embodiments, able to read instructions from a machine-readable medium and perform any one or more of the method steps as discussed herein. Specifically, the machine comprises a computer system and within which instructions 302 (e.g., software) for causing the machine 315 to perform any one or more of the methodologies discussed herein may be executed. The machine 315 operates as a standalone device or may be connected to other machines in one or more geographical locations in a network (e.g., to provide information to, and receive information from, other machines). In a networked deployment, the machine 315 may operate in the capacity of a server machine or a client machine in a server-client network environment, or as a peer machine in a peer-to-peer (or distributed) network environment. Further, while only a single machine is illustrated, the term "machine" shall also be taken to include a collection of machines that individually or jointly execute the instructions 302 to perform any one or more of the methodologies discussed herein. In embodiments in which multiple hardware modules are configured or instantiated at different times, communications between such hardware modules may be achieved, for example, through the storage and retrieval of information in memory structures to which the multiple hardware modules have access.

The machine 315 may be a server computer, a client computer, a personal computer (PC), a tablet computer, a desktop computer, a laptop computer, a netbook, a set-top box (STB), a handheld device (e.g., personal digital assistant (PDA), a smartphone, etc.), a tablet computer, a web appliance, a network router, a network switch, a network bridge, a wireless access point (AP), a wired or wireless router, a wired or wireless modem, a wired or wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), or networks operating in accordance with existing and/or future versions and/or derivatives of long-term evolution (LTE), a device which incorporates a global positioning system (GPS) receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, or any machine capable of executing the instructions 302, sequentially or otherwise, that specify actions to be taken by that machine.

The machine 315 includes a processor 303 (e.g., a central processing unit (CPU), a graphics processing unit (GPU), a digital signal processor (DSP), an application-specific integrated circuit (ASIC), a radio-frequency integrated circuit (RFIC), etc.), a main memory unit 304, and a static memory unit 305, which are configured to communicate with each other via a bus 301.

The machine 315 may further include a video display 309 (e.g., a plasma display panel (PDP), a light emitting diode (LED) display, a liquid crystal display (LCD), a projector, or a cathode ray tube (CRT)). The machine 315 may also include a network interface device 307, an alphanumeric input device 310 (e.g., a keyboard), a user interface navigation device 311 (e.g., a mouse, a touchpad, a trackball, a joystick, a motion sensor, or other pointing instruments), a drive unit 313, and a signal generation device 314 (e.g., a speaker).

The drive unit 313 includes a machine-readable medium 312 on which is stored the instructions 302 embodying any one or more of the methodologies or functions described herein. The instructions 302 may also reside, completely or at least partially, within the processor 303 (e.g., within the processor's cache memory), within the main memory 304, and/or within the static memory unit 305. Accordingly, the processor 303, the main memory 304, and the static memory unit 305 may be considered as machine-readable media. The instructions 302 may be transmitted or received over a computer network 308 via the network interface device 307.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 312 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 315), such that the instructions, when executed by one or more processors of the machine (e.g., processor 303), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

A Scenario for Operation

The following lists of events may be considered a more concrete example of the functionality of the present invention, in a realistic scenario involving real estate agents and clients. In this scenario, the functionality of the system, as more generally shown in FIGS. 1 and 2, is designated by the term "Covve," which might be deemed to be the commercial trade name of such a product/service offering. It is noted that the following steps are not necessarily confined to a specific order and that one or more of the steps can be optional, depending upon embodiments.

Step 1: A first user obtains Covve either as a license or as an online subscription of a web offering such as a mobile site, a mobile application, or the like.

Step 2: The user creates an account on Covve. The following methods are non-limiting examples of methods for entering account information relating to the user in the system: 1) the user can enter his or her own information, via a UI; 2) information relating to the user is automatically imported from third party sources using an import tool.

Step 3: The user synchronizes his or her address books via a synchronization service of Covve. The following methods are non-limiting examples of methods for synchronizing the user's address books: 1) the user is prompted to log into his or her email account to authenticate the user and import the address book associated with the email account; 2) the user's address book stored on the user's device is synchronized.

Step 4: The contacts in the user's address books are enhanced via a metadata population service of Covve. For example, a contact having an email address having a "@gs.com" domain is affiliated with Goldman Sachs and is in the industry of investment banking.

Step 5: The contacts in the user's address books are processed through a blacklist and a whitelist via a blacklist and whitelist service of Covve to screen the contacts and to determine whether the contacts are unsharable or shareable.

Step 6: Contact information for the contacts are made unidentifiable.

Step 7: The contacts representing the same real person is identified and a more complete profile of the real person is created.

Step 8: A second user searches for a contact having specific criteria. Covve locates a contact from the first user's address book that matches the criteria set by the second user.

Step 9: Upon identifying the contact, the first user can opt to share the contact information related to that contact with the second user. Alternatively, the first user is identified as a referrer to that contact and the first user's contact information is shared with the second user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for sharing contact information, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
access a contacts list of one or more address books, wherein the contacts list includes at least one contact;
enhance contact information associated with the at least one contact with populated metadata corresponding with the at least one contact from external services;
determine whether the contact information associated with the at least one contact is sharable with a non-owner of the one or more address books;
if the contact information associated with the at least one contact is sharable, hash at least a portion of the contact information associated with the at least one contact;
identify a person associated with hashed contact information;
consolidate the contact information from each of the one or more address books into a single composite view of the person;
receive, from the non-owner of the one or more address books, a request for the contact information of the at least one contact, the request including one or more criteria;
if the at least one contact meets the one or more criteria included with the request, identify an owner of the one or more address books associated with the contacts list including the at least one contact; and
send, in response to identifying the owner of the one or more address books, contact information of the owner of the one or more address books to the non-owner.

2. The system of claim 1, wherein the one or more address books are fully visible to the owner and limited in visibility to the non-owner based at least on authentication credentials.

3. The system of claim 1, wherein the enhance contact information comprises utilizing metadata population service comprising data mining tools and web crawling tools.

4. The system of claim 1, wherein the one or more processors are further configured to:
process the contact information through a blacklist via a blacklist and whitelist service, wherein the blacklist comprises blacklist terms, further wherein the contact information is unsharable if the contact information comprises one or more of the blacklist terms.

5. The system of claim 1, wherein the one or more processors are further configured to:
  process the contact information through a whitelist via a blacklist and whitelist service, wherein the whitelist comprises whitelist terms, further wherein the contact information is shareable if the contact information comprises only the whitelist terms.

6. The system of claim 1, wherein the one or more processors are further configured to:
  synchronize the contacts list of the one or more address books with a contacts database.

7. The system of claim 1, wherein the one or more processors are further configured to:
  receive permission from the owner of the one or more address books to share the contact information; and
  in response to receiving the permission, serve the contact information.

8. The system of claim 1, wherein the one or more processors are further configured to:
  prompt the owner of the one or more address books to share the contact information.

9. The system of claim 1, wherein the at least a portion of the contact information comprises personally identifiable information (PII).

10. The system of claim 1, wherein the one or more processors are further configured to:
  genericize at least an additional portion of the contact information associated with the at least one contact.

11. A computer-implemented method of sharing contact information, comprising:
  accessing a contacts list of one or more address books, wherein the contacts list includes at least one contact;
  enhancing contact information associated with the at least one contact with populated metadata corresponding with the at least one contact from external services;
  determining whether the contacts information associated with the at least one contact is sharable with a non-owner of the one or more address books;
  if the contact information associated with the at least one contact is sharable, hashing at least a portion of the contact information associated with the at least one contact;
  identifying a person associated with hashed contact information;
  consolidating the contact information from each of the one or more address books into a single composite view of the person;
  receiving, from the non-owner of the one or more address books, a request for the contact information of the at least one contact, the request including one or more criteria;
  if the at least one contact meets the one or more criteria included with the request, identifying an owner of the one or more address books associated with the contacts list including the at least one contact; and
  sending, in response to identifying the owner of the one or more address books, contact information of the owner of the one or more address books to the non-owner.

12. The computer-implemented method of claim 11, wherein the one or more address books are fully visible to the owner and limited in visibility to the non-owner based at least on authentication credentials.

13. The computer-implemented method of claim 11, wherein enhancing contact information comprises utilizing the metadata population service comprising data mining tools and web crawling tools.

14. The computer-implemented method of claim 11, further comprising:
  processing the contact information through a blacklist via a blacklist and whitelist service, wherein the blacklist comprises blacklist terms, further wherein the contact information is unsharable if the contact information comprises one or more of the blacklist terms.

15. The computer-implemented method of claim 11, further comprising:
  processing the contact information through a whitelist via a blacklist and whitelist service, wherein the whitelist comprises whitelist terms, further wherein the contact information is shareable if the contact information comprises only the whitelist terms.

16. The computer-implemented method of claim 11, further comprising:
  synchronizing the contacts list of the one or more address books with a contacts database.

17. The computer-implemented method of claim 11, further comprising:
  receiving permission from the owner of the one or more address books to share the contact information; and
  in response to receiving the permission, serving the contact information.

18. The computer-implemented method of claim 11, further comprising:
  prompting the owner of the one or more address books to share the contact information.

19. The computer-implemented method of claim 11, wherein the at least a portion of the contact information comprises personally identifiable information (PII).

20. The computer-implemented method of claim 11, further comprising:
  genericizing at least an additional portion of the contact information associated with the at least one contact.

* * * * *